(12) United States Patent
Hino et al.

(10) Patent No.: US 10,239,003 B2
(45) Date of Patent: Mar. 26, 2019

(54) POLYMER NANOFIBER ACCUMULATED BODY AND METHOD OF PRODUCING THE SAME

(71) Applicant: CANON KABUSHIKI KAISHA, Tokyo (JP)

(72) Inventors: Tetsuo Hino, Yamato (JP); Kaori Yasufuku, Kawasaki (JP); Kenji Takashima, Numazu (JP); Kazuhiro Yamauchi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 355 days.

(21) Appl. No.: 15/267,426

(22) Filed: Sep. 16, 2016

(65) Prior Publication Data

US 2017/0100687 A1    Apr. 13, 2017

(30) Foreign Application Priority Data

Oct. 7, 2015    (JP) .................. 2015-199398

(51) Int. Cl.
| | | |
|---|---|---|
| *D01D 5/00* | (2006.01) | |
| *D01F 1/10* | (2006.01) | |
| *D01F 6/16* | (2006.01) | |
| *B01D 39/16* | (2006.01) | |
| *D01D 10/02* | (2006.01) | |
| *D01D 5/098* | (2006.01) | |

(52) U.S. Cl.
CPC ......... *B01D 39/1623* (2013.01); *D01D 10/02* (2013.01); *D01F 1/10* (2013.01); *D01F 6/16* (2013.01); *B01D 2239/0618* (2013.01); *B01D 2239/10* (2013.01); *B01D 2239/1233* (2013.01); *B01D 2239/1291* (2013.01); *D01D 5/0038* (2013.01); *D01D 5/0985* (2013.01); *D10B 2321/08* (2013.01)

(58) Field of Classification Search
CPC .............. B01D 39/1623; B01D 39/163; B01D 2239/0618; B01D 2239/10; B01D 2239/1233; B01D 2239/1291; D01D 5/0038; D01D 5/0985; D01D 10/02; D01F 1/10; D01F 6/16; B01B 2321/08

See application file for complete search history.

(56) References Cited

U.S. PATENT DOCUMENTS

| | | | | |
|---|---|---|---|---|
| 9,587,328 | B2 * | 3/2017 | Shenoy | B01D 39/163 |
| 2003/0106294 | A1 * | 6/2003 | Chung | B01D 39/163 |
| | | | | 55/486 |

(Continued)

FOREIGN PATENT DOCUMENTS

JP    2011-214170 A    10/2011

*Primary Examiner* — Jason M Greene
(74) *Attorney, Agent, or Firm* — Venable LLP (57) ABSTRACT

Provided is a nanofiber accumulated body having a high mechanical strength and excellent in durability, the polymer nanofiber accumulated body including polymer nanofibers each containing a polymer material, the polymer nanofibers being accumulated and three-dimensionally entangled with each other to form the accumulated body, in which: the polymer nanofibers each have a fiber diameter of 3 μm or less; and the polymer nanofibers each contain 5 wt % to 30 wt % of a low-molecular weight organic compound having at least one α,β-unsaturated ester structure, with respect to a total weight of the polymer nanofibers.

9 Claims, 3 Drawing Sheets

(56) References Cited

U.S. PATENT DOCUMENTS

| | | | |
|---|---|---|---|
| 2005/0235619 A1* | 10/2005 | Heinz | B01D 39/163 |
| | | | 55/486 |
| 2006/0246798 A1* | 11/2006 | Reneker | D01D 5/0038 |
| | | | 442/59 |
| 2015/0093517 A1 | 4/2015 | Muranaka et al. | |
| 2015/0218324 A1 | 8/2015 | Hino et al. | |
| 2015/0273366 A1 | 10/2015 | Takashima et al. | |
| 2015/0273377 A1 | 10/2015 | Takashima et al. | |
| 2015/0273812 A1 | 10/2015 | Takashima et al. | |
| 2016/0069005 A1 | 3/2016 | Takashima et al. | |
| 2016/0108192 A1 | 4/2016 | Yasufuku et al. | |
| 2016/0296874 A1 | 10/2016 | Yasufuku et al. | |
| 2016/0312385 A1* | 10/2016 | Huerta-Angeles | C08L 5/08 |

\* cited by examiner

POLYMER NANOFIBER ACCUMULATED BODY AND METHOD OF PRODUCING THE SAME

BACKGROUND OF THE INVENTION

Field of the Invention

The present invention relates to a polymer nanofiber accumulated body and a method of producing the same.

Description of the Related Art

In recent years, a polymer nanofiber accumulated body, which is formed as described below and typified by a polymer nanofiber sheet, has been attracting attention. A plurality of polymer nanofibers each containing a polymer material are accumulated, and the polymer nanofibers are three-dimensionally entangled with each other to form the accumulated body.

Incidentally, in a related-art polymer nanofiber accumulated body, polymer nanofibers have been three-dimensionally entangled with each other. However, the entanglement is based on only physical entanglement, and hence the related-art polymer nanofiber accumulated body tends to have a low mechanical strength and to be weak against a tensile force or friction. Accordingly, the accumulated body has involved problems in terms of practical use. In view of the foregoing, an approach for an improvement in mechanical strength of a polymer nanofiber accumulated body has been developed.

In Japanese Patent Application Laid-Open No. 2011-214170, there is a disclosure of an approach involving performing a partial bonding treatment in which a plurality of polymer nanofibers are partially bonded to each other by heating a thread-like polymer nanofiber structural body formed by twisting the polymer nanofibers. In addition, in Japanese Patent Application Laid-Open No. 2011-214170, there is a disclosure that the thread-like structural body (polymer nanofiber accumulated body) formed of the polymer nanofibers is improved in strength by the approach.

However, in the approach of Japanese Patent Application Laid-Open No. 2011-214170, it is difficult to control treatment conditions, such as a temperature, such that the conditions may be suitable for the performance of the partial bonding treatment of the polymer nanofibers. Accordingly, the bonding between the polymer nanofibers does not progress or the polymer nanofibers are largely melted depending on their surrounding environment. When the bonding between the polymer nanofibers does not progress, a strength required for the polymer nanofiber structural body is not obtained. Meanwhile, when the polymer nanofibers are largely melted, the following problem occurs. Surrounding polymer nanofibers are completely integrated with each other, and hence the diameter of a fiber itself becomes several micrometers or more.

SUMMARY OF THE INVENTION

The present invention provides a nanofiber accumulated body having a high mechanical strength and excellent in durability.

A polymer nanofiber accumulated body according to one embodiment of the present invention includes polymer nanofibers each containing a polymer material, the polymer nanofibers being accumulated and three-dimensionally entangled with each other to form the accumulated body, in which: the polymer nanofibers each have a fiber diameter of 3 μm or less; and the polymer nanofibers each contain 5 wt % to 30 wt % of a low-molecular weight organic compound having at least one α,β-unsaturated ester structure, with respect to a total weight of the polymer nanofibers.

According to the present invention, the nanofiber accumulated body having a high mechanical strength and excellent in durability can be provided.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(Polymer Nanofiber Accumulated Body)

The present invention relates to a polymer nanofiber accumulated body obtained by accumulating polymer nanofibers each containing a polymer material and three-dimensionally entangling the nanofibers with each other. In the following description, the polymer nanofiber accumulated body is sometimes abbreviated as "accumulated body". In addition, in the present invention, the fiber diameter of each of the polymer nanofibers is 3 μm or less, the polymer nanofibers each contain 5 wt % to 30 wt % of a low-molecular weight organic compound having at least one molecular structure having an α,β-unsaturated ester, with respect to the total weight of the polymer nanofibers.

The polymer nanofiber accumulated body of the present invention is described below with appropriate reference to drawings.

Figure 1A:
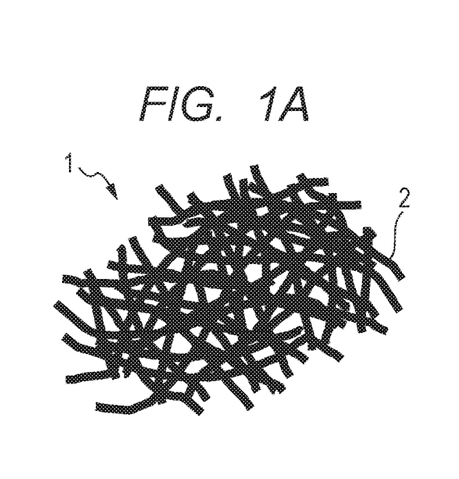
FIG. 1A is a schematic view for illustrating an example of a polymer nanofiber accumulated body according to one embodiment of the present invention.
Figure 1B:
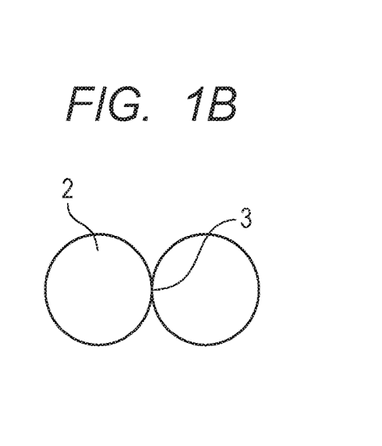
FIG. 1B is an image view for illustrating a portion where polymer nanofibers illustrated in FIG. 1A are brought into contact with each other.

FIG. 1A is a schematic view for illustrating an example of a polymer nanofiber accumulated body according to one embodiment of the present invention, and FIG. 1B is an image view for illustrating a portion where polymer nanofibers illustrated in FIG. 1A are brought into contact with each other.

A polymer nanofiber accumulated body 1 of FIG. 1A and FIG. 1B is obtained by accumulating a plurality of polymer nanofibers 2. Specifically, as illustrated in FIG. 1A, the plurality of polymer nanofibers 2 are accumulated while being three-dimensionally entangled with each other. As described above, the polymer nanofiber accumulated body of the present invention basically includes the polymer nanofibers 2, and hence a moderate space is formed between the plurality of polymer nanofibers 2 entangled with each other.

Meanwhile, each of the polymer nanofibers 2 intersects any other polymer nanofiber at an arbitrary position. In addition, in a portion where the polymer nanofibers 2 intersect each other, e.g., an intersecting portion 3 illustrated in FIG. 1B, the polymer nanofibers 2 are brought into contact with each other.

In the polymer nanofiber accumulated body of the present invention, each of the polymer nanofibers in the accumulated body has, on its surface, a low-molecular weight organic compound containing at least one molecular structure having an $\alpha,\beta$-unsaturated ester. When the low-molecular weight organic compound present on the surface of each of the polymer nanofibers intersects any other polymer nanofiber in, for example, the intersecting portion 3 illustrated in FIG. 1B, the compound is brought close to the low-molecular weight organic compound present on the surface of the other polymer nanofiber. At this time, the molecules of the low-molecular weight organic compound brought close to each other may interact with each other. In addition, the occurrence of the interaction improves the mechanical strength of the polymer nanofiber accumulated body of the present invention. At this time, as the number of opportunities for the interaction between the molecules of the low-molecular weight organic compound increases, the mechanical strength of the accumulated body itself is improved to a larger extent.

In the polymer nanofiber accumulated body, in order that the mechanical strength of the accumulated body itself may be improved, it is necessary that the polymer nanofibers in the accumulated body be crosslinked with each other in the portion (intersecting portion 3) where the polymer nanofibers intersect each other. The inventors have made extensive investigations on a system for the crosslinking between the polymer nanofibers based on the problems in Japanese Patent Application Laid-Open No. 2011-214170. As a result, the inventors have found an approach to causing the low-molecular weight organic compound containing at least one molecular structure having an $\alpha,\beta$-unsaturated ester to exist on the surface of each of the polymer nanofibers. In addition, the inventors have found that a polymer nanofiber accumulated body (film obtained by accumulating the polymer nanofibers) having a strong mechanical strength is obtained by the approach. Thus, the inventors have completed the present invention.

Details about the mechanism via which the effect of the present invention (the mechanical strength of the accumulated body itself is improved) is exhibited are unclear. The one thing that can be said about the foregoing is that at least the low-molecular weight organic compound containing at least one molecular structure having an $\alpha,\beta$-unsaturated ester (hereinafter sometimes referred to as "low-molecular weight organic compound having an $\alpha,\beta$-unsaturated ester structure") present on the surface of each of the polymer nanofibers is involved. The $\alpha,\beta$-unsaturated ester structure of the low-molecular weight organic compound is generally a structure represented by the following formula (1a), but may be such a structure having a cation and an anion as represented by the following formula (1b) as a result of the movement of an electron in a molecule thereof.

When the polymer nanofibers intersect each other, the molecules of the low-molecular weight organic compound present on the respective surfaces of the different polymer nanofibers are brought close to each other in the intersecting portion 3 illustrated in FIG. 1B. At this time, when each of the $\alpha,\beta$-unsaturated esters of the two respective molecules of the low-molecular weight organic compound brought close to each other adopts the structure represented by the formula (1b), an interaction represented by the following formula (2) occurs. Specifically, an intermolecular ionic bond resulting from an electrostatic attraction occurring between the cation and the anion is formed.

The intermolecular ionic bond represented by the formula (2) functions as a crosslinking portion for accelerating the crosslinking between the polymer nanofibers because the bond is a relatively strong bond. In addition, as the number of opportunities for the occurrence of the intermolecular ionic bond represented by the formula (2) increases, a force for crosslinking the polymer nanofibers becomes stronger to an extent corresponding to the increase. Probably as a result of the foregoing, the polymer nanofiber accumulated body of the present invention has a strong mechanical strength.

The intermolecular ionic bond represented by the formula (2) is mainly formed by an interaction between the molecules of the low-molecular weight organic compound present on the respective surfaces of the different polymer nanofibers. When at least part of the polymer material in each of the polymer nanofibers contains a polymer material having an $\alpha,\beta$-unsaturated ester structure, the above-mentioned interaction can occur between the polymer nanofibers or between any one of the polymer nanofibers and the low-molecular weight organic compound.

(Polymer Nanofibers)

The polymer nanofibers constituting the polymer nanofiber accumulated body of the present invention refer to the following fibers: the lengths of the fibers are longer than the thicknesses of the fibers.

The diameter of each of the polymer nanofibers in the polymer nanofiber accumulated body, i.e., a fiber diameter is obtained by measurement with, for example, a laser microscope (manufactured by Keyence Corporation). Specifically, first, a gray scale image is obtained by observing the polymer nanofiber accumulated body with the laser microscope at a magnification of 200. Next, the gray scale image obtained by profiling is enlarged by a factor of 300, and then sectional shapes at three points of a polymer nanofiber are subjected to measurement. The fiber diameter can be determined by averaging the measured values obtained as a result of the measurement. The term "sectional shape" as used herein refers to a shape appearing in a section obtained by observing a cut surface, which is obtained by cutting the polymer nanofiber accumulated body from its thickness direction, from a vertical direction with a SEM.

In the present invention, the fiber diameter is set to 3 µm or less. When the fiber diameter is set as described above, the low-molecular weight organic compound having an $\alpha,\beta$- unsaturated ester structure can be caused to exist on the surface of each of the polymer nanofibers in an amount sufficient to crosslink the polymer nanofibers. When the fiber diameter reduces, the ratio of an exposed portion out of the polymer nanofibers in the polymer nanofiber accumulated body having a certain volume increases, and hence the amount of the low-molecular weight organic compound having an α,β-unsaturated ester structure in the surface of each of the polymer nanofibers increases. However, in consideration of the ease of handling of the polymer nanofibers themselves, the fiber diameter is preferably set to 1 nm or more. Meanwhile, the fiber diameter is preferably 2 µm or less because in the polymer nanofiber accumulated body, a pore can be moderately formed between the polymer nanofibers in the accumulated body. In the present invention, the fiber diameter is more preferably 50 nm or more and less than 1 µm. When the fiber diameter is set to 50 nm or more, it becomes easier to handle the nanofibers. In the present invention, the length of each of the polymer nanofibers is typically 10 or more times as long as the fiber diameter.

In the present invention, the sectional shapes of the polymer nanofibers are not particularly limited, and specific examples thereof include a circular shape, an elliptical shape, a quadrangular shape, a polygonal shape, and a semicircular shape. The sectional shape of each of the polymer nanofibers may not be any such accurate shape as listed above, and the shapes of arbitrary sections of the polymer nanofiber may be different from each other. When it is hypothesized that the shape of each of the polymer nanofibers is a cylindrical shape, the diameter of a circle serving as a section of the cylinder corresponds to the fiber diameter. In addition, when the shape of the nanofiber is not a cylindrical shape, the fiber diameter corresponds to the length of the longest straight line passing a center of gravity in a section of the polymer nanofiber. The shapes of the polymer nanofibers (such as the sectional shapes of the fibers and the diameters of the fibers) can be confirmed by direct observation based on measurement with a scanning electron microscope (SEM) or a laser microscope.

In the present invention, a constituent material for the polymer nanofibers is a polymer material which can form at least a fibrous structure and into which the low-molecular weight organic compound having an α,β-unsaturated ester structure can be incorporated. Specific examples thereof include organic materials including a resin material. However, for example, materials obtained by adding conventionally known materials including inorganic materials, such as silica, titania, and a clay mineral, to the organic materials may also be used.

One kind of the constituent materials for the polymer nanofibers may be used alone, or two or more kinds thereof may be used in combination. In addition, when the resin material is used as the constituent material for the polymer nanofibers, a material obtained by incorporating, for example, an organic low-molecular weight compound, an inorganic material, a fine particle, or a conventionally known filler into the resin material may also be used for the purpose of improving the mechanical strength of each of the polymer nanofibers.

Examples of the polymer material that may be used as the constituent material for the polymer nanofibers may include: a fluorine-containing polymer (e.g., a copolymer with another monomer, such as tetrafluoroethylene and polyvinylidene fluoride (PVDF) (the copolymer may be, for example, a copolymer of PVDF and hexafluoropropylene (PVDF-HFP))); a polyarylene (e.g., an aromatic polyarylene, such as, poly-p-phenylene oxide, poly(2,6-dimethylphenylene oxide), or poly-p-phenylene sulfide); a polyimide; a polyamide; a polyamide-imide; polybenzimidazole; a modified polymer obtained by introducing a sulfonate group (—SO$_3$H), a carboxyl group (—COOH), a phosphate group, a sulfonium group, an ammonium group, or a pyridinium group into a polyolefin, polystyrene, a polyimide, or a polyarylene (aromatic); a modified polymer obtained by introducing a sulfonate group, a carboxyl group, a phosphate group, a sulfonium group, an ammonium group, or a pyridinium group into a skeleton of the fluorine-containing polymer; a polybutadiene-based compound; a polyurethane-based compound (including a polyurethane-based compound in an elastomer form or a gel form); a silicone-based compound; polyvinyl chloride; nylon; a polyarylate; a biodegradable polymer (e.g., polycaprolactone (PCL) or polylactic acid); a polyester (PES) (e.g., polyethylene terephthalate (PET)); and a poly(meth)acrylic derivative (e.g., polymethyl methacrylate (PMMA)).

Of those polymer materials, the poly(meth)acrylic acid derivative and the polyester each serving as a polymer material having a carboxyl group of the low-molecular weight organic compound having an α,β-unsaturated ester structure are preferred. In addition, the polyvinyl chloride, the polyimide, the polyamide, the polyamide imide, and the polybenzimidazole each serving as a polymer material having a polar substituent are preferred. Of those suitable polymer materials, the poly(meth)acrylic acid derivative is particularly preferred.

One kind of the polymer materials listed above may be used alone, or two or more kinds thereof may be used in combination. In addition, in the polymer material except the polyolefin, the polyimide, the polyarylene, and the fluorine-containing polymer, there may be used a modified polymer obtained by introducing a sulfonate group, a carboxyl group, a phosphate group, a sulfonium group, an ammonium group, or a pyridinium group. Further, a copolymer obtained by copolymerizing a plurality of kinds of monomers may be used.

In addition, examples of the inorganic material to be used as the constituent material for the polymer nanofibers may include oxides of metal materials selected from Si, Mg, Al, Ti, Zr, V, Cr, Mn, Fe, Co, Ni, Cu, Sn, and Zn. More specific examples thereof may include metal oxides, such as silica (SiO$_2$), titanium oxide, aluminum oxide, alumina sol, zirconium oxide, iron oxide, and chromium oxide. In addition, a clay mineral, such as montmorillonite (MN), may be used. The inorganic material is preferably incorporated into each of the polymer nanofibers from the viewpoint of an improvement in mechanical strength of the polymer nanofiber accumulated body because the mechanical strength of the polymer nanofiber tends to increase significantly.

In the present invention, each of the polymer nanofibers has, on its surface, the low-molecular weight organic compound containing at least one molecular structure having an α,β-unsaturated ester. Thus, in an intersecting portion where the polymer nanofibers intersect each other, the molecules of the low-molecular weight organic compound easily interact with each other, and as a result, the polymer nanofibers can be strongly crosslinked with each other.

When the constituent material for the polymer nanofibers (e.g., a polymer material, such as a resin material) is a material having a poly(methyl) methacrylate structure, the weatherability, chemical resistance, transparency, and optical characteristics of each of the polymer nanofibers tend to be satisfactory, and the ease of thermal processing, ease of molding, and electrical properties thereof tend to be high. Particularly from the viewpoint of weatherability, the material having a poly(methyl) methacrylate structure is preferred because the polymer nanofibers each have high durability.

(Low-Molecular Weight Organic Compound Having α,β-Unsaturated Ester Structure)

A specific kind of the low-molecular weight organic compound having an α,β-unsaturated ester structure in the polymer nanofiber accumulated body of the present invention is not particularly limited as long as the compound is a low-molecular weight organic compound having a partial structure represented by the formula (1a). For example, an α,β-unsaturated carboxylic acid alkyl ester may be used. Typical examples of the α,β-unsaturated carboxylic acid alkyl ester may include alkyl esters of (meth)acrylic acid each having 4 to 20 carbon atoms. In addition, an alkyl group having 4 to 20 carbon atoms in each of the esters is preferably, for example, any one of a methyl group, an ethyl group, an isopropyl group, a n-butyl group, an isobutyl group, an isostearyl group, a dodecyl group, and a 2-ethylhexyl group. However, in the present invention, the alkyl group is not limited to those substituents.

In addition, in the present invention, the low-molecular weight organic compound may have two or more α,β-unsaturated ester structures in a molecule thereof, and an organic compound such as ethylene glycol dimethacrylate may also be used. When the low-molecular weight organic compound having two or more α,β-unsaturated ester structures in a molecule thereof is incorporated into the surface of a polymer nanofiber, the polymer nanofiber of interest tends to satisfactorily interact with each of a plurality of polymer nanofibers close to the nanofiber. The α,β-unsaturated ester structure of the low-molecular weight organic compound is preferably an acrylate structure or a methacrylate structure in terms of the ease of availability of a material. In addition, in the present invention, one kind of the low-molecular weight organic compounds each having an α,β-unsaturated ester structure may be used alone, or two or more kinds thereof may be used in combination.

The presence of the low-molecular weight organic compound having an α,β-unsaturated ester structure on the surface of each of the polymer nanofibers can be confirmed mainly by IR measurement. The presence of the low-molecular weight organic compound can be confirmed by, for example, subjecting a film-like polymer nanofiber accumulated body to surface observation based on a FT-IR attenuated total reflection measurement method (ATR measurement method). In this case, the presence can be confirmed based on absorption around 1,685 cm$^{-1}$ derived from the α,β-unsaturated ester structure and absorption around 1,735 cm$^{-1}$ derived from an ester bond. In addition, nano-IR by which a surface fine region can be observed may be used in combination. Incidentally, in the present invention, a polymer material having an α,β-unsaturated ester structure may be used as a constituent material for the polymer nanofibers. In the case where such polymer material is used, it may be difficult to confirm that the low-molecular weight organic compound is present on the surface of each of the polymer nanofibers only by the IR measurement. In such case, the presence can be confirmed by using, for example, a mass spectrum in combination. For example, the following method is given: after the surface of the polymer nanofiber accumulated body has been wiped with a solvent or a solution that dissolves the low-molecular weight organic compound, the wiped component is extracted and the wiped component is analyzed by preparative LC/MS.

A method of confirming the presence of the low-molecular weight organic compound except the IR measurement is a method involving utilizing nuclear magnetic resonance (NMR) analysis. For example, the following method is available: the polymer nanofibers are impregnated with a solution in which only the low-molecular weight organic compound dissolves, e.g., an alcohol, and a material that has dissolved in the alcohol is subjected to the NMR analysis.

In the present invention, the molecular weight of the low-molecular weight organic compound (low-molecular weight organic compound containing at least one molecular structure having an α,β-unsaturated ester) to be added to each of the polymer nanofibers is not particularly limited. The molecular weight (number-average molecular weight) is preferably from 100 to 1,000 from the viewpoint of uniform dispersibility in the polymer material serving as a constituent material for the polymer nanofibers. When the molecular weight (number-average molecular weight) of the low-molecular weight organic compound is less than 100, the volatility of the compound itself becomes higher and hence the volatilization of the low-molecular weight organic compound may occur in a spinning process for the polymer nanofibers. Meanwhile, when the molecular weight (number-average molecular weight) of the low-molecular weight organic compound is more than 1,000, it may be difficult for the low-molecular weight organic compound and the polymer material serving as a constituent material for the polymer nanofibers to be uniformly compatible with each other. When the low-molecular weight organic compound and the polymer material are not uniformly compatible with each other, for example, white turbidness occurs at the stage of the mixing of both the compound and the material, or phase separation occurs in a formation process for a sheet. In addition, when the low-molecular weight organic compound is not uniformly compatible in each of the polymer nanofibers, it becomes difficult to cause the α,β-unsaturated ester structure of the low-molecular weight organic compound to exist on the surface of each of the polymer nanofibers. As a result, when the polymer nanofibers are entangled with each other, in a portion where the polymer nanofibers intersect each other, an interaction caused by the α,β-unsaturated ester structure of the low-molecular weight organic compound hardly occurs, and hence the polymer nanofibers cannot be strongly crosslinked with each other.

The number-average molecular weight (Mn) can be generally determined by gel permeation chromatography (GPC).

In the present invention, the presence amount of the low-molecular weight organic compound containing at least one molecular structure having an α,β-unsaturated ester structure in the polymer nanofibers is 5 wt % or more and 30 wt % or less with respect to the total weight of the polymer nanofibers. When the presence amount of the low-molecular weight organic compound is set to 5 wt % or more, in the portion (intersecting portion 3) where the polymer nanofibers intersect each other, an intermolecular interaction resulting from the α,β-unsaturated ester structure can be effectively caused. Meanwhile, when the presence amount of the low-molecular weight organic compound is set to 30 wt % or less, the low-molecular weight organic compound tends to be satisfactorily dispersed in the polymer material, and hence the following tendency is observed: a polymer nanofiber having a satisfactory mechanical strength is stably obtained with ease.

The above-mentioned presence amount is the presence amount of the low-molecular weight organic compound incorporated into the surfaces or insides of the polymer nanofibers. In the present invention, the presence amount of the low-molecular weight organic compound incorporated into the surfaces of the polymer nanofibers is preferably 5 wt % or more and 30 wt % or less with respect to the total weight of the polymer nanofibers. However, an upper limit for the presence amount of the low-molecular weight organic compound incorporated into the surfaces of the polymer nanofibers is the presence amount of the low-molecular weight organic compound incorporated into the surfaces or insides of the polymer nanofibers.

(Average Solubility Parameter)

The polymer material and the low-molecular weight organic compound having an α,β-unsaturated ester structure serving as constituent materials for the polymer nanofiber accumulated body of the present invention are each an organic compound. Accordingly, the low-molecular weight organic compound can be dispersed in a state in which the compound does not undergo phase separation in the polymer material, though the extent of the dispersion varies depending on the characteristics of the compound itself. Accordingly, the low-molecular weight organic compound present on the surface of each of the polymer nanofibers is fixed to the surface of the polymer nanofiber with a certain strength.

Incidentally, one important factor in the polymer nanofiber accumulated body of the present invention is an average solubility parameter (SP value). In the present invention, a difference (SP value difference) between the average solubility parameter of the polymer material and the average solubility parameter of the low-molecular weight organic compound is preferably 0 $(J/cm^3)^{1/2}$ or more and less than 9 $(J/cm^3)^{1/2}$. When the SP value difference is $(J/cm^3)^{1/2}$ or more and less than 9 $(J/cm^3)^{1/2}$, the low-molecular weight organic compound having an α,β-unsaturated ester structure can be more uniformly dispersed in the polymer material. In addition, when the SP value difference is controlled as described above, at the time of the formation of the polymer nanofibers, the low-molecular weight organic compound can be more strongly fixed to the surface of each of the polymer nanofibers.

In the present invention, a solubility parameter is a Hansen solubility parameter. The Hansen parameter is formed of the dispersion force of an atom, a force occurring between the permanent dipoles of molecules, and energy formed of a hydrogen bond between the molecules, and the three components are represented by $\delta_D$, $\delta_P$, and $\delta_H$ $[(J/cm^3)^{1/2}]$, respectively. At this time, a solubility parameter $\delta$ $[(J/cm^3)^{1/2}]$ of a substance is represented by the following formula.

$$\delta=(\delta_D^2+\delta_P^2+\delta_H^2)^{1/2}[(J/cm^3)^{1/2}]$$

Incidentally, a measured value for the Hansen parameter of a general substance is obtained from a literature value, and even in the case of a special substance whose Hansen parameter is not obtained as a literature value, the parameter can be calculated with calculation software.

Incidentally, when a difference in Hansen parameter between a plurality of kinds (e.g., two kinds) of substances in a mixture obtained by mixing the respective substances is large, energy needed for uniformly mingling the substances enlarges. Accordingly, when the difference in Hansen parameter is large, the solubility of a solute in a solvent reduces, and hence mingling between the solute and the solvent does not progress. When a difference in Hansen parameter between a substance a and a substance b is defined as $|\Delta\delta(a-b)|[(J/cm^3)^{1/2}]$, the $|\Delta\delta(a-b)|$ can be calculated from the following formula.

$$|\Delta\delta(a-b)|=\{4(\delta_{Da}-\delta_{Db})^2+(\delta_{Pa}-\delta_{Pb})^2+(\delta_{Ha}-\delta_{Hb})^2\}^{1/2}$$

The difference between the Hansen parameters of the polymer material and the low-molecular weight organic compound constituting the polymer nanofiber accumulated body of the present invention is less than 9 $(J/cm^3)^{1/2}$. When the difference between the Hansen parameters of both the material and the compound becomes 9 $(J/cm^3)^{1/2}$ or more, phase separation between the polymer material and the low-molecular weight organic compound is liable to progress in a production process for the polymer nanofiber accumulated body of the present invention, and hence an interaction resulting from the low-molecular weight organic compound hardly occurs in, or on the surface of, each of the polymer nanofibers. Accordingly, a polymer nanofiber accumulated body having a high peel strength or a high mechanical strength is not obtained.

(Physical Properties of Polymer Nanofiber Accumulated Body)

In the polymer nanofiber accumulated body of the present invention, the number of the polymer nanofibers present on an arbitrary surface, an interval between the polymer nanofibers, and the number of the laminated polymer nanofibers may be appropriately selected and set in accordance with desired characteristics of the polymer nanofiber accumulated body. For example, the portion where the polymer nanofibers each having, on its surface, the low-molecular weight organic compound having an α,β-unsaturated ester structure intersect each other, i.e., the intersecting portion 3 is moderately arranged in the polymer nanofiber accumulated body 1 of FIG. 1A and FIG. 1B. As a result, the plurality of polymer nanofibers 2 close to each other interact with each other in the intersecting portion 3, and hence the polymer nanofiber accumulated body of the present invention is strong. Therefore, the nanofiber accumulated body of the present invention has a satisfactory mechanical strength, e.g., satisfactory wind pressure resistance. Accordingly, the accumulated body is advantageous for long-term use as, for example, a constituent member for a dust-collecting filter.

Incidentally, one evaluation factor for the mechanical strength of the polymer nanofiber accumulated body is a tensile modulus. When the polymer nanofiber accumulated body of the present invention is used as a constituent member for a dust-collecting filter, the tensile modulus of the accumulated body itself is desirably 100 MPa or more. When the tensile modulus is less than 100 MPa, the accumulated body cannot satisfy a mechanical strength required for the accumulated body to serve as a sheet for a dust-collecting filter, and hence the accumulated body cannot be used as a dust-collecting filter for a long time period. When the polymer nanofiber accumulated body of the present invention is used as a constituent member for a dust-collecting filter, the tensile modulus of the accumulated body itself is preferably 250 MPa or more.

In addition, in consideration of the possibility that the polymer nanofiber accumulated body of the present invention is utilized as, for example, a constituent member for a dust-collecting filter to be mounted on a vent hole, the accumulated body preferably has a mechanical strength equal to or more than a certain value. Specifically, the accumulated body is preferably capable of withstanding a certain wind pressure in addition to having a tensile modulus of 100 MPa or more. The phrase "withstanding a certain wind pressure" as used herein means that when air having a certain pressure is blown against the polymer nanofiber accumulated body, the accumulated body itself is not broken. Whether or not the accumulated body can withstand a certain wind pressure can be confirmed, for example, as follows: an air gun is used, air having a pressure of 50 Pa is blown from the air gun against one film-like polymer nanofiber accumulated body attached to cardboard for 2 minutes while a distance between the air gun and the accumulated body is set to 3 cm, and whether or not the accumulated body is broken is observed.

The polymer nanofiber accumulated body of the present invention is, for example, a sheet-like member formed by the entanglement of the polymer nanofibers. When the polymer nanofiber accumulated body of the present invention is a sheet-like member, the accumulated body itself has a certain thickness, but in the present invention, the thickness of the accumulated body itself is not particularly limited. In the present invention, the thickness of the sheet-like polymer nanofiber accumulated body is preferably 1 μm or more and 1 mm or less, more preferably 10 μm or more and less than 100 μm. In the polymer nanofiber accumulated body of the present invention, when the polymer nanofibers in the accumulated body intersect each other, an intermolecular interaction occurs in the intersecting portion, and hence the polymer nanofibers are strongly crosslinked with each other. As a result, the polymer nanofiber accumulated body of the present invention is excellent in mechanical strength and durability. Accordingly, the thickness can be set so as to be of the order of micrometers. When the thickness of the polymer nanofiber accumulated body is less than 1 μm, the entanglement of the polymer nanofibers does not sufficiently occur, and hence the number of opportunities for the above-mentioned intermolecular interaction cannot be increased in some cases. Meanwhile, when the thickness of the polymer nanofiber accumulated body is set to less than 100 μm, the air permeability of the polymer nanofiber accumulated body becomes particularly excellent.

In the polymer nanofiber accumulated body of the present invention, a pore having a certain size is formed between the polymer nanofibers. In the present invention, the average of the diameters of the pores formed between the polymer nanofibers, i.e., pore diameters is preferably 5 μm or less, more preferably 10 nm or more and 5 μm or less, still more preferably 50 nm or more and 5 μm or less. When the average of the pore diameters is 10 nm or less, the pores of the polymer nanofiber accumulated body are small on average. Meanwhile, when the average of the pore diameters is more than 5 μm, the pores of the polymer nanofiber accumulated body are large on average and hence a mechanical strength desired for the polymer nanofiber accumulated body is not obtained in some cases.

For example, a presence ratio represented by the ratio of the volumes of the polymer nanofibers to the volume (including gap portions) of the polymer nanofiber accumulated body of the present invention is known as a quantitative indicator of the local structure of the polymer nanofiber accumulated body. A plurality of definitions in accordance with how to determine the ratio of the volumes of the polymer nanofibers are present for the presence ratio. Specifically, the presence ratio comes in a unit presence ratio, an average presence ratio, and the like. Herein, the unit presence ratio is the area ratio of the polymer nanofibers in a portion in a fracture surface of the polymer nanofiber accumulated body, the portion having a thickness comparable to a fiber diameter in a lamination direction. Meanwhile, the average presence ratio is the average of the unit presence ratios in the thickness of a specific portion. In the following description, the presence ratio refers to the average presence ratio of a target portion unless otherwise stated. In the present invention, the presence ratio (average presence ratio) of the polymer nanofibers on the surface of the polymer nanofiber accumulated body is preferably 10% or more and 60% or less. When the presence ratio is less than 10%, the amount of the polymer nanofibers present on the surface of the polymer nanofiber accumulated body reduces. Meanwhile, when the presence ratio is more than 60%, the adhesion of a slight amount of a substance to a pore portion may cause the clogging of the pore.

The diameters and shapes of the polymer nanofibers in the polymer nanofiber accumulated body of the present invention (e.g., the sectional shapes of the polymer nanofibers or the diameters thereof) can be confirmed by, for example, direct observation through measurement with a scanning electron microscope (SEM) or a laser microscope. In addition, the thickness of the polymer nanofiber accumulated body can be confirmed with a thickness meter using reflection spectroscopy or a micrometer.

(Applications of Polymer Nanofiber Accumulated Body)

The polymer nanofiber accumulated body of the present invention can be used over a long time period even when an external factor, such as friction, is applied thereto. Accordingly, the accumulated body can be utilized as a constituent member for a dust-collecting filter for capturing a particle, such as dust, dirt, or a fine particle, the filter being mounted to a vent hole of a container for a toner or the like. However, the applications of the polymer nanofiber accumulated body of the present invention are not limited to the constituent member for a dust-collecting filter. For example, the accumulated body can be suitably utilized as a triboelectric charging material used in a static electricity generator or an apparatus for selecting a particle with an electric field. In addition, the use mode of the polymer nanofiber accumulated body of the present invention, which is not particularly limited, is, for example, the use mode as a flat-plate film, or the mode in which the accumulated body is rolled around a roller-like member to be used.

When the polymer nanofiber accumulated body of the present invention is utilized as, for example, a constituent member for a dust-collecting filter to be utilized in a vent hole portion, a laminate of the plurality of polymer nanofiber accumulated bodies may be used for an improvement in mechanical strength.

(Method of Producing Polymer Nanofiber Accumulated Body)

Next, a method of producing the polymer nanofiber accumulated body of the present invention is specifically described. The polymer nanofiber accumulated body of the present invention can be produced by performing at least the following steps (1) and (2), provided that a step except the following steps (1) and (2) may be appropriately performed:

(1) a film-forming step of spinning polymer nanofibers each having a polymer material and a low-molecular weight organic compound having at least one α,β-unsaturated ester structure to form a polymer nanofiber film; and (2) a heating step of heating the polymer nanofiber film formed in the step (1).

In the present invention, in the step (2) (heating step), the polymer nanofiber film is heated at a temperature less than the melting point of the polymer material and less than the boiling point of the low-molecular weight organic compound. In addition, in the present invention, in the step (1) (film-forming step), a polymer solution containing the polymer material and the low-molecular weight organic compound is preferably used. In the step (1), a polymer solution containing 5 wt % to 30 wt % of the low-molecular weight organic compound with respect to the total weight of the polymer material is more preferably used. When a polymer solution is used in the step (1) as described above, a solution-preparing step of preparing the polymer solution is performed before the step (1).

An embodiment of the method of producing a polymer nanofiber accumulated body of the present invention is described below, but the present invention is not limited to the embodiment to be described below.

(A) Solution-Preparing Step

As described above, the polymer material and the low-molecular weight organic compound having at least one α,β-unsaturated ester structure in the polymer nanofiber accumulated body are desirably brought into a state of being compatible with each other. Accordingly, when the polymer nanofiber film is formed by spinning the polymer nanofibers, a mixture containing the polymer material and the low-molecular weight organic compound is preferably prepared before the spinning of the polymer nanofibers. In the present invention, a specific aspect of the mixture is not particularly limited, but the mixture is preferably in a solution state in order that the mixture may be easily handled at the time of the spinning of the polymer nanofibers.

The step of preparing a solution containing the polymer material and the low-molecular weight organic compound to be performed before the spinning of the polymer nanofibers is described below.

The polymer material to be used at the time of the preparation of the solution is not particularly limited as long as the polymer material has the following features: the material can form polymer nanofibers in a spinning step to be described later; and the low-molecular weight organic compound can be incorporated into the surface of each of the polymer nanofibers. Specific examples of the polymer material may include polymer materials listed as constituent materials for polymer nanofiber structural bodies.

In the present invention, a small amount of a Lewis acid catalyst may be added to the solution to be prepared in this step in order that the intersecting portion 3 produced by contact between the polymer nanofibers may be effectively obtained. The Lewis acid catalyst transforms the α,β-unsaturated ester structure of the low-molecular weight organic compound into a structure represented by the formula (1-b), and acts as a chelate center between two α,β-unsaturated ester structures each of which has been transformed into the structure represented by the formula (1-b). Thus, effective formation of the intersecting portion 3 at the time of the contact between the polymer nanofibers can be expected.

When the Lewis acid catalyst is used at the time of the production of the polymer nanofiber accumulated body of the present invention, a usable catalyst is not particularly limited as long as the catalyst has Lewis acidity, but examples thereof include: organometallic complexes, such as an aluminum chelate complex, an iron-allene complex, a titanocene complex, and an aryl silanol-aluminum complex; and compounds whose anion components are a quaternary ammonium salt, a phosphonium salt, an iodonium salt, and a sulfonium salt, such as an antimony hexafluoride ion ($SbF_6^-$), an antimony tetrafluoride ion ($SbF_4^-$), and a phosphorus hexafluoride ion ($PF_6^-$).

(B) Spinning Step (Film-Forming Step)

When the polymer nanofiber accumulated body of the present invention is produced, a polymer nanofiber film serving as a precursor of an accumulated body formed by spinning the polymer nanofibers needs to be produced. In this case, a method of spinning the polymer nanofibers is not particularly limited, but examples thereof include an electrospinning method and a melt blow method. Of the above-mentioned methods, the electrospinning method is a method involving spinning and forming the polymer nanofibers under a state in which a high voltage (of, for example, about 20 kV) is applied between a syringe filled with the solution and a collector electrode. In addition, out of the above-mentioned methods, the electrospinning method having the following feature is preferably adopted: a production process (spinning process) for the polymer nanofibers is simple.

Figure 2:
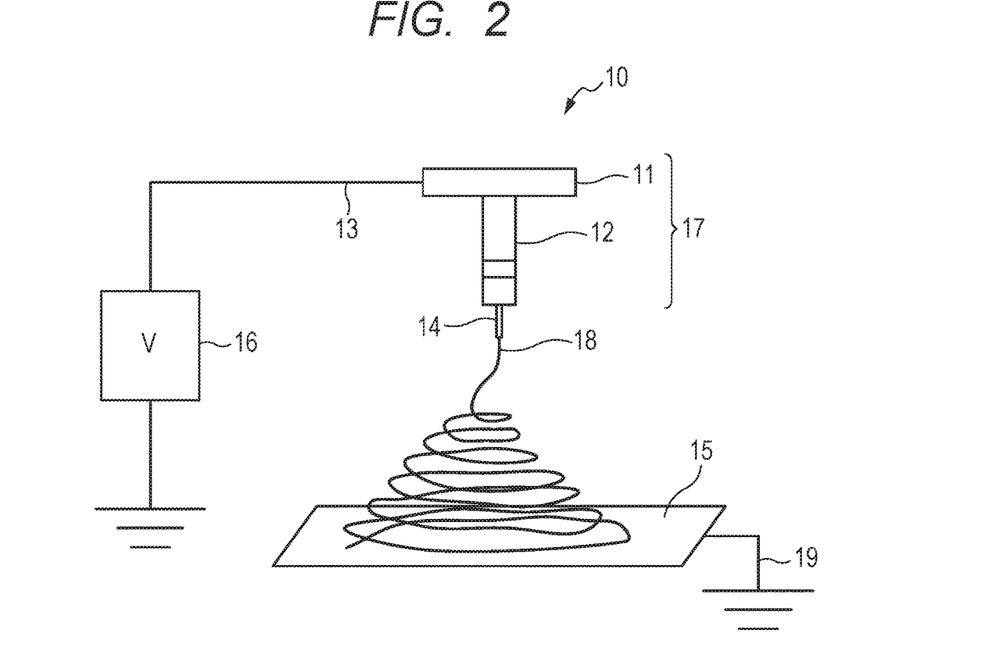
FIG. 2 is a schematic view for illustrating an example of an apparatus for producing a polymer nanofiber film.

A method of producing the polymer nanofiber film through the spinning of the polymer nanofibers by the electrospinning method is described below with reference to the drawing. FIG. 2 is a schematic view for illustrating an example of an apparatus for producing the polymer nanofiber film.

A production apparatus 10 of FIG. 2 includes: a head 17 including a storage tank 12 and a connecting portion 11; a high-voltage power source 16; and a collector 15. In the production apparatus 10 of FIG. 2, the storage tank 12 is configured to store the mixture containing the polymer material and the low-molecular weight organic compound, e.g., a mixture in a solution state (polymer solution), and the tank has a spinning nozzle 14 and is arranged at a predetermined position above the collector 15 through intermediation of the connecting portion 11. In the production apparatus 10 of FIG. 2, the connecting portion 11 is a member to be electrically connected to the high-voltage power source 16 through a wiring 13. That is, the production apparatus 10 of FIG. 2 can apply a voltage output from the high-voltage power source 16 to the connecting portion 11 and a member connected to the connecting portion 11, e.g., the spinning nozzle 14.

In the production apparatus 10 of FIG. 2, the collector 15 is a member for collecting a polymer nanofiber spun from the spinning nozzle 14, and is arranged so as to face the head 17 with a certain interval therebetween. In the production apparatus 10 of FIG. 2, the collector 15 is connected to the ground by a wiring 19.

In the production apparatus 10 of FIG. 2, a voltage of from 1 kV to 50 kV is applied to the spinning nozzle 14, and when an electrical attraction exceeds the surface tension of the mixture, a jet 18 of the mixture is jetted toward the collector 15. When the mixture in a solution state is jetted from the spinning nozzle 14, a solvent in the jet 18 gradually volatilizes, and at the time of its arrival at the collector 15, a corresponding polymer nanofiber is obtained. When the spinning is performed with the production apparatus 10 of FIG. 2, for example, the mixture in a solution state (polymer solution) set to such a condition that the mixture is turned into a nanofiber is introduced into the tank 12. A polymer solution containing 5 wt % to 30 wt % of the low-molecular weight organic compound with respect to the total weight of the polymer material is preferably introduced into the tank 12.

Incidentally, when the low-molecular weight organic compound constituting the polymer nanofibers is added to the mixture in a solution state at the stage of the solution-preparing step, at the time of the spinning and formation of the polymer nanofibers in this step, the low-molecular weight organic compound can be caused to adhere to the inside or surface of each of the formed polymer nanofibers. In this case, the low-molecular weight organic compound that has adhered to the surface of each of the polymer nanofibers is brought into a state of being interposed between the polymer nanofibers in at least part of the portions where the polymer nanofibers are in contact with each other in the entanglement of the polymer nanofibers in the course of the progress of the spinning step.

(C) Heating Step (Contacting Step)

Next, the polymer nanofiber film produced by the preceding step (spinning step) is heated to produce the polymer nanofiber accumulated body. This step is a step also called a contacting step because the step is also the step of bringing the polymer nanofibers entangled with each other in the polymer nanofiber film into contact with each other. The performance of this step improves the mechanical strength of the polymer nanofiber accumulated body of the present invention.

In this step, at the time of the heating of the polymer nanofiber film, a method for the heating and a temperature condition are not particularly limited as long as the polymer nanofibers entangled with each other can be efficiently brought into contact with each other by the method and under the condition.

In this connection, a method involving heating the polymer nanofiber film while pressing the film may also be adopted because the method itself is simple, but a method involving heating the polymer nanofiber film under a state in which the film is not pressed is preferred. This is because of the following reason. When the polymer nanofiber film is heated under a state of not being pressed, air in the film is flowed by the heating to sway the polymer nanofibers constituting the film, and as a result, the polymer nanofibers entangled with each other intersect, or are brought into contact with, each other efficiently. In the case where the polymer nanofiber film is heated while being pressed, a gap in the polymer nanofiber accumulated body may contract, but in the case where the polymer nanofiber film is heated under a state of not being pressed, the above-mentioned contraction of the gap does not occur. Accordingly, the latter case is suitable.

In this step, when the polymer nanofiber film is heated, a temperature condition for the heating is desirably set to a temperature less than the melting point of the polymer material constituting the film and less than the boiling point of the low-molecular weight organic compound. However, when the film is heated at a temperature around the melting point of the polymer material, the polymer material itself may melt. Accordingly, the temperature is preferably set to a temperature lower than the melting point of the polymer material by 30° C. or more, and is more preferably set to a temperature lower than the melting point of the polymer material by 50° C. or more. In addition, when the film is heated at a temperature around the boiling point of the low-molecular weight organic compound in the film, the low-molecular weight organic compound tends to largely volatilize. Accordingly, the temperature condition at the time of the heating of the film is preferably set to a temperature lower than the boiling point of the low-molecular weight organic compound by 30° C. or more, and is more preferably set to a temperature lower than the boiling point of the low-molecular weight organic compound by 50° C. or more.

In addition, when the polymer nanofiber film is heated under a state of not being pressed, the molecular motion of the low-molecular weight organic compound in the film can be thermally activated. Accordingly, the number of opportunities for an interaction between the molecules of the low-molecular weight organic compound in the surfaces of the polymer nanofibers of the polymer nanofiber film increases. As a result, in the portion where the molecules of the low-molecular weight organic compound interact with each other, i.e., the intersecting portion 3, the number of opportunities for contact between the polymer nanofibers increases, and hence the mechanical strength of the polymer nanofiber accumulated body to be produced, e.g., its tensile modulus is improved.

In this step, a method of heating the polymer nanofiber film (method of applying energy to the polymer nanofiber film) is not particularly limited, but examples thereof include heat application, UV irradiation, electron beam irradiation, ultrasonic wave application, and electromagnetic wave application. Heating by the heat application out of those methods is preferred because of, for example, the following reasons: the uniformity of the accumulated body is improved; and a process itself is simple. In particular, a method involving heating the polymer nanofiber film with an oven can uniformly heat the entirety of the polymer nanofiber film without unevenness. As a result, the intersecting portion 3 in which an area of contact between the polymer nanofibers is properly controlled can be formed without the impairment of the shapes of the polymer nanofibers in the film. Accordingly, the method is particularly preferred.

Now, the present invention is described in detail by way of Examples. However, the present invention is not limited to Examples to be described below. In addition, those obtained by appropriately changing or modifying Examples to be described below to the extent that such change or modification do not deviate from the gist of the present invention are also included in the present invention.

(Measurement Methods and Evaluation Methods)

Measurement methods and evaluation methods for the physical properties of polymer nanofiber accumulated bodies produced in Examples or Comparative Examples to be described later are described below.

(1) Fiber Diameter

The diameter of a polymer nanofiber in a polymer nanofiber accumulated body, i.e., a fiber diameter was obtained by measurement with a laser microscope (manufactured by Keyence Corporation). Specifically, first, a gray scale image was obtained by observing the polymer nanofiber accumulated body with the laser microscope at a magnification of 200. Next, the gray scale image was enlarged by a factor of 300 with a "Profile", and then the average of the values obtained by subjecting sectional shapes at three points of the fiber to measurement was defined as the fiber diameter.

(2) Average Thickness of Polymer Nanofiber Accumulated Body

The average thickness of a polymer nanofiber accumulated body was obtained by determining the average of values obtained by measuring its thicknesses with QUICK MICRO (manufactured by Mitutoyo Corporation) at three points.

(3) Evaluation of Polymer Nanofiber Accumulated Body for its Tensile Modulus

A polymer nanofiber accumulated body was evaluated for its tensile modulus by a method to be described below.

Figure 3:
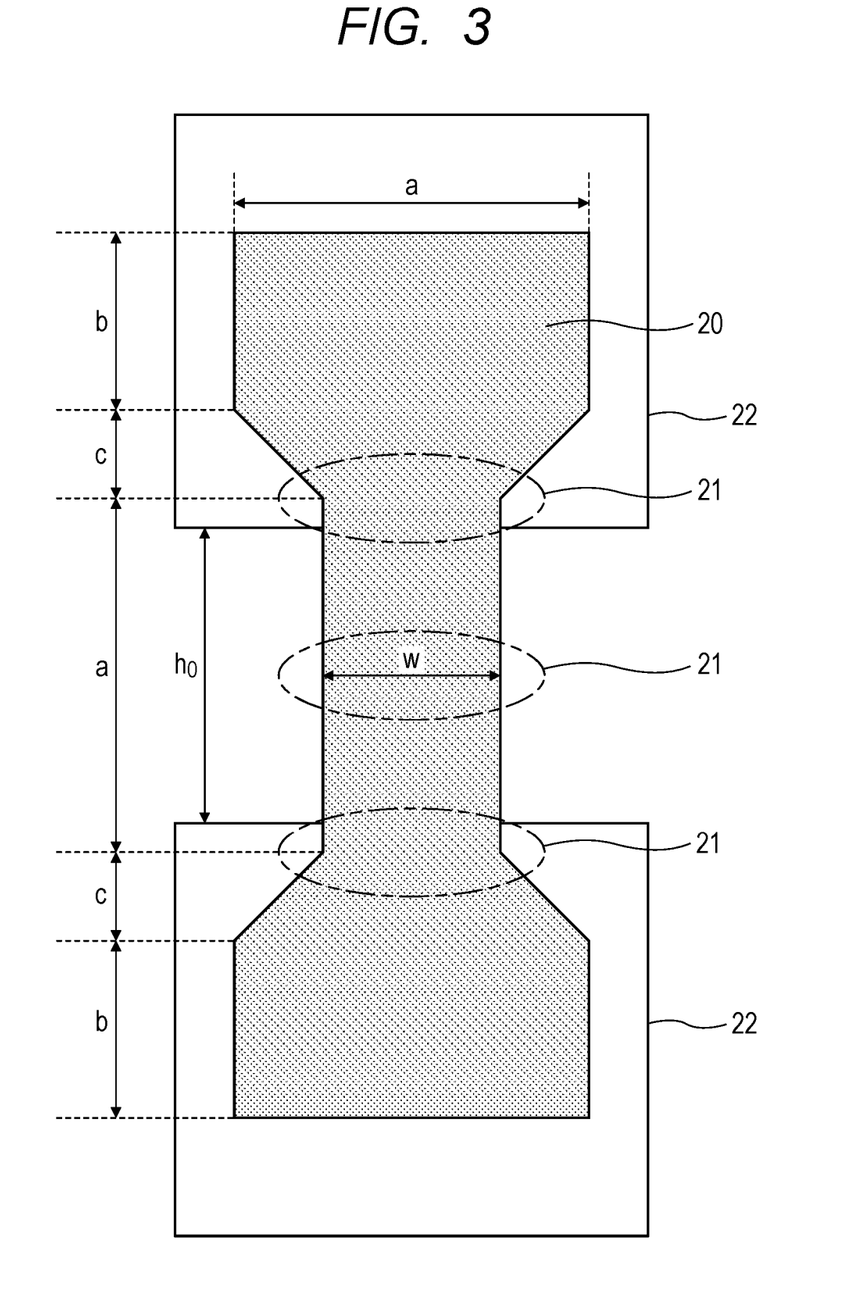
FIG. 3 is a schematic plan view for illustrating a sample produced at the time of the performance of the evaluation of a nanofiber accumulated body for its tensile modulus.

Part of the polymer nanofiber accumulated body peelable from an aluminum foil serving as a base material was cut out to produce a dumbbell-shaped sample 20 illustrated in FIG. 3. When the sample 20 was produced from each of the polymer nanofiber accumulated bodies obtained in Examples or Comparative Examples to be described later, a, b, and c in FIG. 3 were set to 2 cm, 1 cm, and 0.5 cm, respectively. However, the setting is merely a specific example, and in the present invention, the dimensions of the sample 20 illustrated in FIG. 3 may be freely set. Next, the thicknesses of three dash-dotted line portions each represented by reference symbol 21 in FIG. 3 were measured with a micrometer, and the average of the values was defined as the thickness (t) of the polymer nanofiber accumulated body. Next, the widths of the three dash-dotted line portions each represented by reference symbol 21 were measured with a caliper, and the average of the values was defined as the width (w) of the polymer nanofiber accumulated body. Next, the sample 20 (polymer nanofiber accumulated body) of FIG. 3 was inserted into a tensile tester. In this case, sites into which the sample was inserted were set to rectangular regions each represented by reference symbol 22 in FIG. 3. It is because of the following reason that the sites into which the sample 20 is inserted are each designated as represented by reference symbol 22 in FIG. 3: a value in which the area of a dumbbell grip portion is not taken into consideration needs to be obtained in order that the tensile modulus of the sample 20 may be precisely measured. Next, the length of a site represented by reference symbol $h_0$ in FIG. 3 was measured with a caliper. Reference symbol $h_0$ in FIG. 3 means an initial tensile length. Next, the thickness (t), the width (w), and the initial tensile length ($h_0$) were input in measurement software. Next, values for the height and stroke of the tensile tester were each reset to zero. Next, the sample 20 was pulled at 1 mm/min. The length by which the sample 20 was pulled, i.e., a tensile length ($\Delta h$) was calculated in advance by using a value calculated with the software. Then, the rupture of the sample 20 was visually observed, followed by the stopping of the pulling. A tensile force applied to the sample 20 when the rupture of the sample 20 was visually observed was defined as a test force (N).

A tensile modulus (G) was determined by using the values for the thickness (t), the width (w), the tensile length ($\Delta h$), and the test force (N) obtained by the foregoing process. The tensile modulus (G) was obtained by: calculating a strain ($\varepsilon$) and a stress ($\sigma$) from the following formula (2-1) and the following formula (2-2), respectively; and determining the slope of a tangent up to a yield point when a stress-strain curve was drawn through the use of the following formula (2-3).

$$\Delta h/h_0 = \varepsilon \quad (2\text{-}1)$$

$$N/(wt) = \sigma \quad (2\text{-}2)$$

$$\sigma/\varepsilon = G \quad (2\text{-}3)$$

The tensile test was performed on each sample twice, and the average of the resultant values was defined as the tensile modulus of the polymer nanofiber accumulated body. In the case where a large difference occurred between the respective values when the test was performed twice, the tensile test was performed three or more times. In this case, the average of two values that differed from each other to the smallest extent out of the values obtained by the test was defined as the tensile modulus of the polymer nanofiber accumulated body. In the measurement, a value was determined while a Poisson's ratio in association with a change in shape of the accumulated body at the time of the tensile measurement was ignored.

(4) Evaluation of Polymer Nanofiber Accumulated Body for its Durability

A polymer nanofiber accumulated body was tested for its durability as described below. An air gun was placed so as to be distant from one polymer nanofiber accumulated body attached to cardboard by 3 cm, and wind having a pressure of 0.1 MPa was blown against the polymer nanofiber accumulated body for 2 minutes by using the air gun. The testing was performed by evaluating whether or not the polymer nanofiber accumulated body was broken at this time. A method for the evaluation was as follows: after the wind had been blown from the air gun against the polymer nanofiber accumulated body, whether or not the polymer nanofiber accumulated body was broken or damaged was visually observed. Specific evaluation criteria are as described below.

○: The breakage or damage of the polymer nanofiber accumulated body was not observed (the case where part of the accumulated body was deformed was included).

x: The breakage or damage of the polymer nanofiber accumulated body was observed.

Example 1

(1) Solution-Preparing Step

First, dimethylformamide (DMF) and polymethyl methacrylate (PMMA, manufactured by Sumitomo Chemical Co., Ltd., SP value: 9.5, melting point: 160° C.) were mixed to provide a DMF solution containing 30 wt % of the solute (PMMA). Next, the DMF solution was mixed with isostearyl acrylate (molecular weight: 324, manufactured by Osaka Organic Chemical Industry Ltd., SP value: 16.5, boiling point: 120° C./0.8 mmHg) at a ratio of 10 wt % with respect to the PMMA. A SP value difference between the PMMA and isostearyl acrylate is 7. Next, the DMF solution was mixed with an appropriate amount of SAN-AID SI-100 (Sanshin Chemical Industry Co., Ltd.) serving as an additive (Lewis acid catalyst). Thus, a paste diluted liquid was prepared.

(2) Spinning Step

Next, the paste diluted liquid prepared in the step (1) was jetted with an electrospinning apparatus (manufactured by MEC Co., Ltd.) illustrated in FIG. 2 by an electrospinning method, and the resultant polymer nanofiber was collected on a collector.

This step was performed as described below. First, the paste diluted liquid prepared in the step (1) was loaded into the tank 12 of the electrospinning apparatus. Then, the diluted liquid was jetted toward the collector 15 for 3 hours while a voltage of 18 kV was applied from the high-voltage power source 16 to the spinning nozzle 14 and while the head 17 was horizontally moved at 10 mm/s.

(3) Heating Step

Thus, a film (polymer nanofiber film) having an average thickness of 30 μm in which the polymer nanofibers were entangled and accumulated was able to be easily obtained. Next, the resultant polymer nanofiber film was peeled from the collector 15, and was then mounted on a polytetrafluoroethylene sheet attached onto a glass plate. After that, the resultant was loaded into an oven and subjected to a heating treatment at 120° C. for 2 hours. Thus, a polymer nanofiber accumulated body having a plurality of intersecting portions in each of which the polymer nanofibers intersected each other was obtained. The thickness (average of the fiber diameters) of the polymer nanofibers in the polymer nanofiber accumulated body thus obtained was 500 nm, and the tensile modulus of the accumulated body itself was 300 MPa. The presence of isostearyl acrylate on the surface of each of the nanofibers in the polymer nanofiber accumulated body obtained in this example was confirmed by a FT-IR ATR method.

Figure 4:
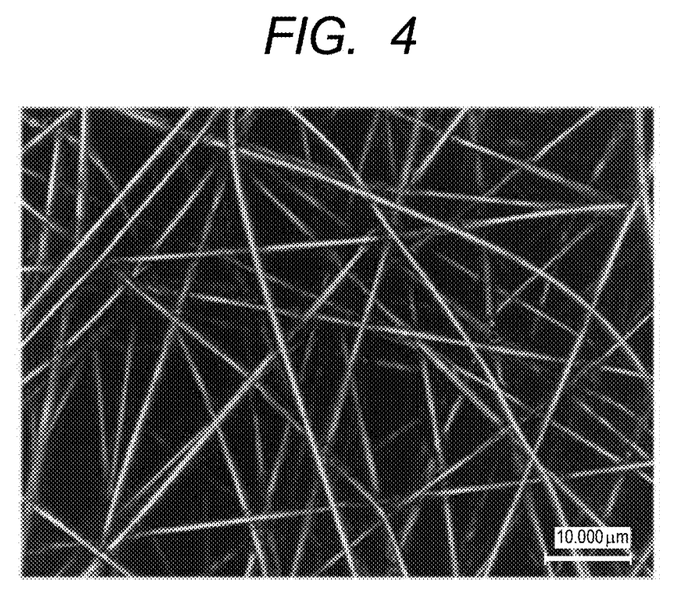
FIG. 4 is a view for showing a laser microscope photograph of a polymer nanofiber accumulated body produced in Example 1.

FIG. 4 is a view for showing a laser microscope photograph of the polymer nanofiber accumulated body produced in this example. FIG. 4 is a photograph obtained by photographing the surface side of the polymer nanofiber accumulated body, and a scale shown in the lower right corner of the figure is a scale representing 10,000 µm. It was confirmed that as shown in FIG. 4, the polymer nanofiber accumulated body obtained in this example was obtained by accumulating the polymer nanofibers and had a plurality of intersecting portions. It was also able to be confirmed that the shapes of the plurality of polymer nanofibers in the polymer nanofiber accumulated body were substantially uniform, and a moderate space was formed in the accumulated body.

Example 2

A polymer nanofiber accumulated body was obtained by the same method as that of Example 1 except that in the step (1) of Example 1, ethylene glycol dimethacrylate (molecular weight: 198, boiling point: 100° C./5 mmHg, SP value: 18.2) was used instead of isostearyl acrylate. In this example, ethylene glycol dimethacrylate was loaded at a ratio of 25 wt % with respect to the PMMA. In addition, a SP value difference between the PMMA and ethylene glycol dimethacrylate used in this example was 8.7.

The polymer nanofiber accumulated body obtained in this example was found to have a plurality of intersecting portions in each of which polymer nanofibers intersected each other. In addition, the thickness (average of the fiber diameters) of the polymer nanofibers in the resultant polymer nanofiber accumulated body was 430 nm, and the accumulated body had an average film thickness of 32 µm and a tensile modulus of 350 MPa. The presence of ethylene glycol dimethacrylate on the surface of each of the polymer nanofibers in the polymer nanofiber accumulated body obtained in this example was confirmed by a FT-IR ATR method.

Figure 5:
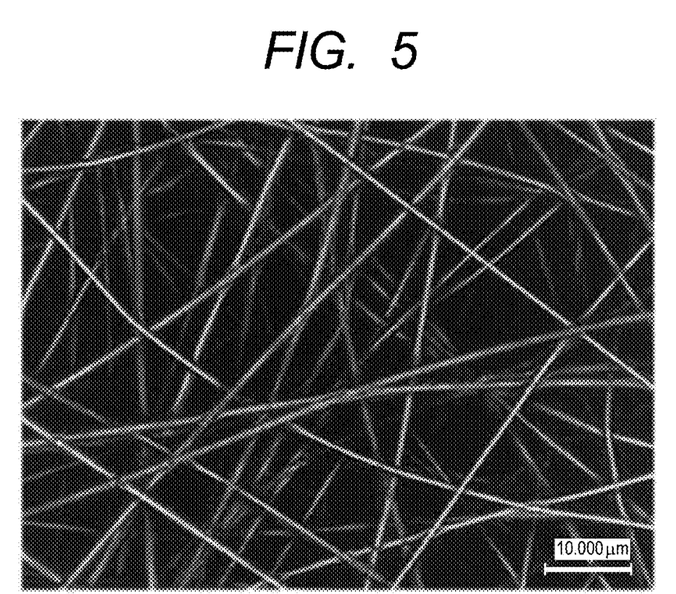
FIG. 5 is a view for showing a laser microscope photograph of a polymer nanofiber accumulated body produced in Example 2.

FIG. 5 is a view for showing a laser microscope photograph of the polymer nanofiber accumulated body produced in this example. FIG. 5 is a photograph obtained by photographing the surface side of the polymer nanofiber accumulated body, and a scale shown in the lower right corner of the figure is a scale representing 10,000 µm. It was confirmed that as shown in FIG. 5, the polymer nanofiber accumulated body obtained in this example was obtained by accumulating the polymer nanofibers and had a plurality of intersecting portions. It was also able to be confirmed that the shapes of the plurality of polymer nanofibers in the polymer nanofiber accumulated body were substantially uniform, and a moderate space was formed in the accumulated body.

Example 3

(1) Solution-Preparing Step

A paste diluted liquid A was prepared by the same method as that of the step (1) of Example 1. In addition, a paste diluted liquid B was prepared by the same method as that of Example 2.

(2) Spinning Step

Polymer nanofibers obtained by jetting the two respective kinds of paste diluted liquids (the paste diluted liquid A and the paste diluted liquid B) prepared in the step (1) with an electrospinning apparatus including two heads by an electrospinning method were collected on a collector.

This step was performed as described below. First, the paste diluted liquids (the paste diluted liquid A and the paste diluted liquid B) prepared in the step (1) were loaded into the two respective tanks of the electrospinning apparatus. Then, the respective paste diluted liquids were jetted from spinning nozzles toward the collector. A voltage to be applied to each of the spinning nozzles, the time period for which each of the paste diluted liquids was jetted, and the moving speed of a holder to be horizontally moved at the time of the jetting of each of the paste diluted liquids were set to be identical to those of the step (2) of Example 1.

The polymer nanofiber accumulated body obtained in this example was found to have a plurality of intersecting portions in each of which the polymer nanofibers intersected each other. In addition, the thickness (average of the fiber diameters) of the nanofibers in the resultant polymer nanofiber accumulated body was 470 nm, and the accumulated body had an average film thickness of 31 µm and a tensile modulus of 300 MPa. In addition, the presence of ethylene glycol dimethacrylate and isostearyl acrylate on the surface of each of the polymer nanofibers in the polymer nanofiber accumulated body was confirmed by analysis based on a FT-IR ATR method. The presence of ethylene glycol dimethacrylate and isostearyl acrylate on the surface of each of the polymer nanofibers was also able to be confirmed by washing the resultant accumulated body with deuterated isopropyl alcohol and subjecting the washed accumulated body to NMR analysis.

Comparative Example 1

A polymer nanofiber accumulated body was obtained by the same method as that of Example 1 except that in the step (1) of Example 1, the addition of isostearyl alcohol and the additive was omitted.

The thickness (average of the fiber diameters) of nanofibers in the resultant polymer nanofiber accumulated body was 430 nm, and the accumulated body had an average film thickness of 30 µm and a tensile modulus of 75 MPa.

Comparative Example 2

A polymer nanofiber accumulated body was obtained by the same method as that of Example 1 except that in the step (1) of Example 1, a polyolefin (manufactured by Zeon Corporation, melting point: 220° C., SP value: 7.7) was used instead of the PMMA, and decalin was used instead of DMF. A SP value difference between the polyolefin and isostearyl acrylate is 10.5.

The thickness (average of the fiber diameters) of nanofibers in the resultant polymer nanofiber accumulated body was 500 nm, and the accumulated body had an average film thickness of 30 µm and a tensile modulus of 37 MPa. The resultant accumulated body was subjected to surface observation (FT-IR ATR method), but a peak derived from isostearyl acrylate could not be observed.

(Evaluation of Nanofiber Accumulated Body)

The physical properties of the polymer nanofiber accumulated bodies obtained in Examples and Comparative Examples were measured and evaluated. The results are shown in Table 1.

TABLE 1

|  | Average polymer fiber diameter [nm] | Tensile modulus [MPa] | Durability |
|---|---|---|---|
| Example 1 | 500 | 300 | ○ |
| Example 2 | 430 | 350 | ○ |

TABLE 1-continued

|  | Average polymer fiber diameter [nm] | Tensile modulus [MPa] | Durability |
|---|---|---|---|
| Example 3 | 470 | 300 | ○ |
| Comparative Example 1 | 430 | 75 | x |
| Comparative Example 2 | 500 | 37 | x |

The facts that were able to be made clear or confirmed in Examples and Comparative Examples are described below.

The polymer nanofiber accumulated bodies produced in Examples (Examples 1 to 3) were each found to be significantly improved in tensile modulus as compared to the polymer nanofiber accumulated body of Comparative Example 1. The foregoing results from the fact that in each of the accumulated bodies of Examples 1 to 3, the surfaces of the polymer nanofibers each contain a low-molecular weight organic compound containing at least one molecular structure having an α,β-unsaturated ester. That is, when the polymer nanofibers intersected each other, the polymer nanofibers were strongly crosslinked with each other in the intersecting portion by an interaction between the molecules of the low-molecular weight organic compound present on the surfaces of the polymer nanofibers, and hence a high mechanical strength was obtained. Probably as a result of the foregoing, the tensile modulus and wind pressure resistance of the accumulated body itself were improved.

Meanwhile, in each of the polymer nanofiber accumulated bodies of Comparative Examples 1 and 2, a low-molecular weight organic compound containing at least one molecular structure having an α,β-unsaturated ester was not present on the surface of each of the polymer nanofibers in the accumulated body. Accordingly, each of the resultant accumulated bodies did not have a sufficient tensile modulus, and when a stress was applied thereto, the stress was not sufficiently dispersed and the disentanglement of the polymer nanofibers occurred. Probably because of the foregoing, a sufficient mechanical strength was not obtained and hence the film of the polymer nanofiber accumulated body was broken by a wind pressure.

In Comparative Example 2, a low-molecular weight organic compound containing at least one molecular structure having an α,β-unsaturated ester was incorporated as one constituent material for the polymer nanofibers, but the low-molecular weight organic compound was not present on the surface of each of the polymer nanofibers. This may be caused by the fact that the SP value difference between the polymer material serving as a parent material for the polymer nanofibers and the low-molecular weight organic compound was 9 or more, and hence the effect by which the low-molecular weight organic compound and the polymer material were made compatible with each other was low. Meanwhile, in each of Examples 1 to 3, the SP value difference between the polymer material and the low-molecular weight organic compound was less than 9. Probably because of the foregoing, the polymer material and the low-molecular weight organic compound were made uniformly compatible with each other. In other words, it is found that when the SP value difference between the polymer material and the low-molecular weight organic compound was less than 9, the low-molecular weight organic compound was present on the surface of each of the polymer nanofibers, and hence the tensile modulus and durability of the polymer nanofiber accumulated body itself were improved.

In addition, each of the polymer nanofiber accumulated bodies obtained in Examples 1 to 3 had a tensile modulus of 100 MPa or more, and hence it was able to be confirmed that the construction of the present invention was effective in improving the mechanical strength of the accumulated body.

An evaluation for an air permeability was further performed for evaluating each of the polymer nanofiber accumulated bodies of Examples 1 to 3 for its adaptability to a dust-collecting filter. Specifically, each of the polymer nanofiber accumulated bodies was evaluated for its air permeability with an air permeability tester, and when the air permeability was 0.4 cc/cm$^2$/sec or more at the time of the application of an air pressure of 125 Pa, the air permeability was judged to be satisfactory. As a result of the test, "satisfactory" evaluation results were obtained in all the polymer nanofiber accumulated bodies of Examples 1 to 3, and hence it was able to be confirmed that the polymer nanofiber accumulated body of the present invention was useful as a constituent material for a dust-collecting filter.

As described above, peeling resistance between the polymer nanofibers of the polymer nanofiber accumulated body of the present invention was satisfactory, and hence the accumulated body was found to have the following property: the mechanical strength of the accumulated body itself was high. In addition, the polymer nanofiber accumulated body of the present invention is advantageous for long-term use because the polymer nanofibers in the accumulated body are not easily frayed by virtue of the presence of the property.

In addition, the polymer nanofiber accumulated body of the present invention is improved in tensile modulus. Accordingly, the mechanical strength of the accumulated body itself is improved, and hence the accumulated body is excellent in durability, e.g., wind pressure resistance. In other words, the polymer nanofiber accumulated body of the present invention can be used as, for example, a constituent member for a dust-collecting filter over a long time period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-199398, filed Oct. 7, 2015, which is hereby incorporated by reference herein in its entirety.

What is claimed is:

1. A polymer nanofiber accumulated body, comprising polymer nanofibers each containing a polymer material, the polymer nanofibers being accumulated and three-dimensionally entangled so as to be in contact with each other to form the accumulated body, wherein:
    the polymer nanofibers each have a fiber diameter of 3 μm or less;
    the polymer nanofibers each contain 5 wt % to 30 wt % of a low-molecular weight organic compound having at least one α,β-unsaturated ester structure, with respect to a total weight of the polymer nanofibers, and each of the polymer nanofibers has the low-molecular weight organic compound on a surface thereof;
    the low-molecular weight organic compound has a molecular weight of 100 to 1,000;
    the low-molecular weight organic compound is an alkyl ester of (meth)acrylic acid, the alkyl ester including an alkyl group having 4 to 20 carbon atoms; and the polymer nanofibers are crosslinked with each other at a position where the polymer nanofibers are in contact with each other.

2. The polymer nanofiber accumulated body according to claim 1, wherein a presence amount of the low-molecular weight organic compound present on a surface of the polymer nanofiber accumulated body is from 5 wt % to 30 wt % with respect to the total weight of the polymer nanofibers.

3. The polymer nanofiber accumulated body according to claim 1, wherein a difference between an average solubility parameter of the polymer material and an average solubility parameter of the low-molecular weight organic compound is 0 $[J/cm^3]^{1/2}$ to less than 9 $[J/cm^3]^{1/2}$.

4. The polymer nanofiber accumulated body according to claim 1, wherein the fiber diameter is 50 nm to less than 1 μm.

5. The polymer nanofiber accumulated body according to claim 1, wherein the polymer nanofiber accumulated body has a tensile modulus of 100 MPa or more.

6. A dust-collecting filter for capturing a particle, comprising the polymer nanofiber accumulated body of claim 1.

7. A method of producing a polymer nanofiber accumulated body, comprising:
    forming a polymer nanofiber film by spinning polymer nanofibers so that the polymer nanofibers are in contact with each other, each of the polymer nanofibers containing a polymer material and a low-molecular weight organic compound having at least one $\alpha,\beta$-unsaturated ester structure, the low-molecular organic compound being on a surface of respective said polymer nanofibers; and
    heating the polymer nanofiber film and crosslinking the respective said polymer nanofibers at a position where the polymer nanofibers are in contact with each other by forming an ionic bond between the low-molecular organic compound that is on the respective said polymer nanofibers,
    wherein the low-molecular weight organic compound has a molecular weight of 100 to 1,000, and
    wherein the low-molecular weight organic compound is an alkyl ester of (meth)acrylic acid, the alkyl ester including an alkyl group having 4 to 20 carbon atoms.

8. The method according to claim 7, wherein the forming of the polymer nanofiber film comprises using a polymer solution containing 5 wt % to 30 wt % of the low-molecular weight organic compound with respect to a total weight of the polymer material.

9. The method according to claim 7, wherein the heating comprises heating the polymer nanofiber film at a temperature that is less than a melting point of the polymer material and less than a boiling point of the low-molecular weight organic compound.

* * * * *